United States Patent [19]

Pendlebury

[11] 4,072,663

[45] Feb. 7, 1978

[54] TRANSFER SYSTEM FOR CONVEYING POLYESTER POLYMER

[75] Inventor: David Pendlebury, Chester, Va.

[73] Assignee: Allied Chemical Corporation, Morris Township, N.J.

[21] Appl. No.: 770,731

[22] Filed: Feb. 22, 1977

[51] Int. Cl.² ............................................. C08G 63/70
[52] U.S. Cl. ............................ 260/75 M; 260/75 T; 264/176 F
[58] Field of Search .......................... 260/75 M, 75 T; 264/176 F

[56] References Cited

U.S. PATENT DOCUMENTS

| 3,000,053 | 9/1961 | Hart | 425/376 X |
|---|---|---|---|
| 3,480,706 | 11/1969 | Carpenter et al. | 264/176 F |
| 3,553,171 | 1/1971 | Ocker | 260/75 M |
| 3,644,294 | 2/1972 | Siclari et al. | 260/75 M |
| 3,758,658 | 9/1973 | Riggert | 264/176 F |
| 3,822,334 | 7/1974 | Patterson | 264/210 F |

Primary Examiner—Lucille M. Phynes
Attorney, Agent, or Firm—Fred L. Kelly

[57] ABSTRACT

In the production of polyester fibers in a melt-spinning process, the transfer system between the melt source and the spinning position has a special importance due to the thermal degradation of the polyester. The present invention provides an improved transfer process which ensures relatively low thermal degradation of the molten polymer. The process is characterized by employment of two or more indexes whereby transfer elements and polymer flows in the transfer system may be correlated for minimum degradation of the polymer. The invention is of particular importance in a continuous process involving continuous polyester polycondensation coupled with continuous melt-spinning.

10 Claims, No Drawings

TRANSFER SYSTEM FOR CONVEYING POLYESTER POLYMER

BACKGROUND OF THE INVENTION

This invention relates to a melt-spinning process for production of polyester fibers. More particularly, it relates to continuous transport of a polyester melt from a melt source to a melt-spinning operation. In one preferred embodiment the invention relates to a process involving a continuous polyester polycondensation system coupled with a continuous melt-spinning system.

Pertinent patents include U.S. Pat. No. 3,480,706 to Carpenter et al. on a melt-spinning process involving continuously transferring and pumping a molten thermo-plastic polymer from a condensation reactor to a spinning pack; U.S. Pat. No. 3,758,658 to Riggert on a melt spinning process featuring the steps of supplying a polymer melt at a temperature below the spinning temperature and heating the melt prior to filament formation; and U.S. Pat. No. 3,000,053 to Hart on a melt spinning apparatus wherein the holdup time of the spinning composition in the system is maintained constant. More recently, Geiger in Verfahrenstechnic 9, No. 1 (Mainz) (1975), discloses a method for optimization of transfer lines for high viscosity liquids.

Accordingly, it is well known in this art to continuously transfer and/or pump and/or filter a thermoplastic polymer melt prior to melt-spinning. However, the prior art does not disclose a polyester transfer process that provides low thermal degradation of the polyester during transfer. It is important that in terms of polymer degradation, a transfer process that is eminently suitable for heat-sensitive polyester polymers would not be equally suitable for other polymers such as polyamide polymers. In this regard, the extent of degradation of the polyester polymer during transfer may be estimated from the rate of carboxyl formation.

SUMMARY OF THE INVENTION

The present invention is directed to a polyester transfer process which overcomes the disadvantages of the prior art process. This is accomplished by employment of two or more indexes whereby polymer flows and transfer zones of the transfer system may be correlated to provide minimum degradation of the polyester polymer.

The process of the present invention may be summarized as follows: In a process for the production of synthetic filaments from a high-molecular weight thermoplastic polymer selected from the group consisting of polyester polymers by melt-spinning, which polymers are subject to thermal decomposition at temperatures above about 270° C., including the steps of supplying a melt of said polymer from a polymer source, and transferring the polymer melt by means of pumps and transfer lines to a melt-spinning system, the improvement which comprises:

a. continuously supplying said polymer melt at a temperature of 270° C. to 300° C., preferably 270° C. to 280° C., and at a rate between 100 and 10,000 pounds per hour to a screw pump, said polymer melt having an intrinsic viscosity of 0.85 to 1.05, preferably 0.90 to 0.98;

b. pumping said polymer melt by means of said screw pump through a first pipe zone to a gear pump, the pipe in said first pipe zone being sized so that the rate of flow of the polymer melt in the pipe is maintained in accordance with the limit formula:

$$D_1 = K_1 (Q_1)^{\frac{1}{2}}$$

where $Q_1$ is the rate of flow of polymer melt in the pipe in pounds per hour, $D_1$ is the inside diameter of the pipe in inches, and $K_1$ is about 0.310 to 0.380, said polymer melt being maintained at a temperature of 270° C. to 300° C.;

c. then pumping said polymer melt by means of said gear pump through a second pipe zone to a metering pump, the pipe in said second pipe zone being sized so that the rate of flow of the polymer melt is maintained in accordance with the limit formula:

$$D_2 = K_2 (Q_2)^{\frac{1}{2}}$$

where $Q_2$ is the rate of flow of the polymer melt in the pipe in pounds per hour, $D_2$ is the inside diameter of the pipe in inches, and $K_2$ is about 0.230 to 0.290, said polymer melt being maintained at a temperature of 270° C. to 300° C.; and d. then pumping said polymer melt by means of said metering pump directly to a spin pot comprising a filter medium and a spinnerette to extrude the polymer melt into a quenching chamber to form filaments.

As compared with prior art processes, the transfer process of the present invention effectively decreases decompositon of the molten polyester. Typically, carboxyl formation during the transfer is reduced by at least 0.6 carboxyl equivalents per $10^6$ grams of polymer, so that the total carboxyl increase through the transfer system and spin pot can be maintained at a relatively low value, e.g., below 7 carboxyl equivalents per $10^6$ grams of polymer. Moreover, the decomposition of the polyester polymer may be related to the decrease in intrinsic viscosity of the polymer during transfer and spinning. The present invention is of particular importance in production of high strength polyester fibers at high production rates, e.g., 60 to 80 pounds per hour per spin position.

DESCRIPTION OF THE PREFERRED EMBODIMENT

The preferred process of the invention involves a continuous polyester polycondensation system combined with a continuous polymer transfer system combined with a continuous melt-spinning system. The operation and utility of the process will be apparent from the following examples, wherein parts and percentages are by weight unless otherwise specified.

The preferred polyesters are the linear terephthalate polyesters, i.e., polyesters of a glycol containing from 2 to 20 carbon atoms and a dicarboxylic acid component containing at least about 75 percent terephthalic acid. The remainder, if any, of the dicarboxylic acid component may be any suitable dicarboxylic acid such as sebacic acid, adipic acid, isophthalic acid, sulfonyl-4-4'-dibenzoic acid, or 2,8-di-benzofuran-dicarboxylic acid. The glycols may contain more than two carbon atoms in the chain, e.g., diethylene glycol, butylene glycol, decamethylene glycol, and bis-1,4-(hydroxymethyl)cyclohexane. Examples of linear terephthalate polyesters which may be employed include poly(ethylene terephthalate) and poly(butylene terephthalate).

EXAMPLE 1

Forty-one and one-half parts per hour of purified terephthalic acid, 23 parts per hour of ethylene glycol and 0.88 part per hour of diisopropylamine are continuously fed to a paddle wheel mixer where they are converted to a paste. The paste mixture is then pumped from the mixer by a feed pump to the inlet of a circulating pump. The paste mixture is pumped with 40 parts of recirculating mixture by the circulating pump through a multiple tube and shell heat exchanger where it is heated to 260°–270° C. After leaving the heat exchanger, the mixture enters an esterifying reactor maintained at 260°–270° C. by conventional heating means, and 90–110 psig. pressure by means of an automatic vent valve. The reaction mixture leaving this reactor is split, with part returned to the inlet of the circulating pump where it is combined with fresh paste, and part is reduced in pressure to near atmospheric in a series of three reactors maintained at 260°–270° C., then flowed for polycondensation to the first in a series of three polycondensation reactors operating at subatmospheric pressure, wherein the final polycondensation reactor in the series of reactors is an essentially horizontal totally enclosed cylindrical reactor having an essentially horizontal polyester flow, a pool of polyester in its lower portion, and driven wheels to create high surface area in the polyester to facilitate evaporation of volatiles from the polymer. The pool of polyester in the final reactor is maintained by a pump and any change in inventory of polyester in said reactor may be estimated by observing the change in level on a conventional level recorder. A preferred reactor is described in detail in U.S. Pat. No. 3,976,431. Excellent results are also obtained with use of the reactor described in U.S. Pat. No. 3,728,083.

The polyethylene terephthalate polyester polymer issuing from the final polycondensation reactor has an average intrinsic viscosity of 0.96 unit. This polymer is transferred to a melt spinning system in accordance with the method of present invention. It is first fed at a temperature of 276° C. to a conventional screw pump operating at about 1920 pounds per hour. The polymer melt exits this screw pump at a pressure of 350 psig. and a temperature of 286° C. and is fed through a first pipe zone maintained at 286° C. to two gear pumps in parallel, operating at 13 revolutions per minute. For minimum thermal degradation of the polymer, the pipes in the first pipe zone are sized so that the rate of flow of the polymer melt in each pipe is maintained in accordance with the limit formula:

$$D_1 = K_1 (Q_1)^{\frac{1}{2}}$$

where $Q_1$ is the rate of flow of the polymer melt in the pipe in pounds per hour, $D$ is the inside diameter of the pipe in inches, and $K_1$ is between 0.331 and 0.360.

The polymer melt exits the two gear pumps at a pressure of 2150 psig. and a temperature of about 292° C. and is fed through a second pipe zone maintained at 292° C. to 294° C. to 32 conventional metering pumps in parallel arrangement. For minimum thermal degradation of the polymer, the pipes in the second pipe zone are sized so that the rate of flow of the polymer melt in each pipe is maintained in accordance with the limit formula:

$$D_2 = K_2 (Q_2)^{\frac{1}{2}}$$

where $Q_2$ is the rate of flow of the polymer melt in the pipe in pounds per hour, $D_2$ is the inside diameter of the pipe in inches and $K_2$ is between 0.248 and 0.270.

The metering pumps operate at about 13 revolutions per minute. The polymer melt exits the 32 metering pumps at a pressure of about 3000 psig. and a temperature of 298° C. and is fed directly to a spin pot comprising a spinning filter and a spinnerette, the spinning filter being disposed between the metering pump and the spinnerette. The spinning filter consists of a conventional sieve filter combination of 24 metal screen layers. The pressure drop through the spinning filter averages about 2500 psig. The spin pot is enclosed in a controlled high temperature atmosphere so that the loss of heat from the polymer melt is minimized. The increase in melt enthalpy through the metering pump and sieve filter is sufficient to heat the polymer melt at a point immediately above the spinnerette to about 305°–310° C., and the pressure at this point is about 500 psig. The flow of polymer through the spinnerette is maintained at a constant rate of 60 pounds per hour by the metering pumps.

The spinnerette is divided into two parts by means of an undrilled stripe wide enough to form a visible split between the multiple ends below the spinnerette. The spinnerette plate has 384 holes (192 holes on each side of the undrilled stripe), each 0.018-inch diameter, spaced so that the distance between the filaments formed is 0.28 to 0.40 inch immediately below the spinnerette.

From the spinnerette there is extruded two ends of multifilament, continuous filament yarn, and the two ends are passed downwardly into a substantially stationary column of air contained in a heated sleeve about 15 inches in height, disposed surrounding and immediately beneath the spinnerette. The air temperature in the heated sleeve is maintained at about 300° C. at the top of the sleeve, decreasing to about 115° C. at the bottom. A heated sleeve baffle is provided at the bottom of the heated sleeve forming an inwardly extending flange to minimize flow of cooling air into the heated sleeve.

The two ends of multifilament yarn leaving the heated sleeve are passed directly into the top of a conventional quenching chimney, such as that described in U.S. Pat. No. 3,936,253 to Fisher et al., wherein they are in contact with cooling air introduced into the path of the filaments. The undrawn yarn thus produced may be further treated by conventional procedures well known in this art.

In this example, the total residence time of the polymer melt in the transfer system and spin pot is 18 minutes, and the total carboxyl increase is 5 equivalents per $10^6$ grams of polymer. Total decrease in intrinsic viscosity of the polymer is about 0.05 unit.

In further tests, it is shown that the preferred residence time of the polymer melt in the transfer system and spin pot should be less than 20 minutes. Thus, the spinning unit should be located as closely as possible to the final polycondensation reactor in order to minimize length of the transfer lines. The screw pump is preferably located at the base of the final polycondensation reactor, and the screw pump is designed for relatively low discharge pressure, e.g., 350 psig., to minimize temperature rise across the pump. The gear pumps for transfer of the polymer should be located as closely as possible to the screw pump discharge, and the preferred pump is a rotary gear pump with low temperature rise characteristics. The number and size of the gear pumps should be selected so that normal operating speeds are 10–15 revolutions per minute. Preferred gear pump suction pressure is 100–250 psig. Preferred metering pump suction pressure is 200–1000 psig.

The pipes in the transfer system are preferably cooled with a Dowtherm ®solution at a minimum liquid temperature of 265° C. If in-line static mixers are used in the transfer system, the mixers are preferably located before major flow divisions and immediately prior to the spinning system.

EXAMPLE 2

The procedure of Example 1 is followed except that several pipes supplied from the gear pumps contain low pressure drop static mixers to improve uniformity of the polymer. It is found that for minimum thermal degradation of the polymer, these pipes must be sized so that the rate of flow of the polymer melt in each pipe is maintained in accordance with the limit formula:

$$D_3 = K_3(Q_3)^{\frac{1}{2}}$$

where $Q_3$ is the rate of flow of the polymer melt in the pipe in pounds per hour, $D_3$ is the inside diameter of the pipe in inches, and $K_3$ is between 0.331 and 0.360.

I claim:

1. In a process for the production of synthetic filaments from a high-molecular weight thermoplastic polymer selected from the group consisting of polyester polymers by melt-spinning, which polymers are subject to thermal decomposition at temperatures above about 270° C., including the steps of supplying a melt of said polymer from a polymer source, and transferring the polymer melt by means of pumps and transfer lines to a melt-spinning system, the improvement which comprises:
   a. continuously supplying said polymer melt at a temperature of 270° to 300° C. and at a rate between 100 and 10,000 pounds per hour to a screw pump, said polymer melt having an intrinsic viscosity of 0.85 to 1.05;
   b. pumping said polymer melt by means of said screw pump through a first pipe zone to a gear pump, the pipe in said first pipe zone being sized so that the rate of flow of the polymer melt in the pipe is maintained in accordance with the limit formula:

$$D_1 = K_1(Q_1)^{\frac{1}{2}}$$

where $Q_1$ is the rate of flow of polymer melt in the pipe in pounds per hour, $D_1$ is the inside diameter of the pipe in inches, and $K_1$ is 0.310 0.380, said polymer melt being maintained at a temperature of 270° to 300° C.;
   c. then pumping said polymer melt by means of said gear pump through a second pipe zone to a metering pump, the pipe in said second pipe zone being sized so that the rate of flow of the polymer melt is maintained in accordance with the limit formula:

$$D_2 = K_2(Q_2)^{\frac{1}{2}}$$

where $Q_2$ is the rate of flow of the polymer melt in the pipe in pounds per hour, $D_2$ is the inside diameter of the pipe in inches, and $K_2$ is about 0.230 to 0.290; said polymer melt being maintained at a temperature of 270° to 300° C.; and
   d. then pumping said polymer melt by means of said metering pump directly to a spinning pot comprising a filter medium and a spinnerette to extrude the polymer melt into a quenching chamber to form filaments.

2. The process of claim 1 wherein the polyester is a polyester of a glycol containing from 2 to 20 carbon atoms and a dicarboxylic acid component containing at least about 75 percent terephthalic acid.

3. The process of claim 2 wherein the polyester is polyethylene terephthalate.

4. The process of claim 3 wherein the polymer source is a continuous polyester polycondensation system.

5. The process of claim 4 wherein the polyester polymer melt in step (a) is supplied at a temperature of 270° C. to 280° C. and at an intrinsic viscosity of 0.90 to 0.98.

6. The process of claim 4 wherein the polyester polymer melt in step (b) is maintained at a temperature of 280° C. to 290° C.

7. The process of claim 4 wherein the polyester polymer melt in step (c) is maintained at a temperature of 290° C. to 300° C.

8. The process of claim 4 wherein the total residence time of the polyester polymer melt in said screw pump and in steps (b), (c), and (d) is less than twenty minutes.

9. The process of claim 4 wherein the polyester polymer melt in said second pipe zone in step (c) is mixed by low pressure drop static mixers.

10. The process of claim 9 wherein each pipe containing said static mixers is sized so that the rate of flow of the polymer melt in said pipe is maintained in accordance with the limit formula:

$$D_3 = K_3(Q_3)^{\frac{1}{2}}$$

where $Q_3$ is the rate of flow of the polymer melt in the pipe in pounds per hour, $D_3$ is the inside diameter of the pipe in inches, and $K_3$ is between 0.310 and 0.380.

* * * * *